July 5, 1960  L. S. FITE  2,943,865
WEIGHT DISTRIBUTING TRUCK BED ATTACHMENT
Filed March 25, 1958  2 Sheets-Sheet 1
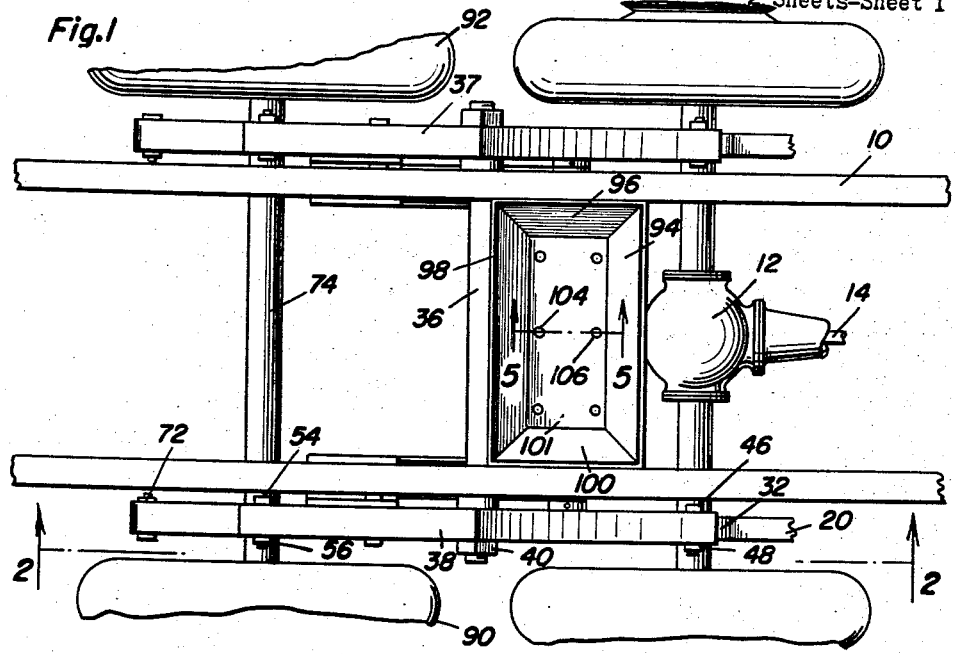
Fig.1
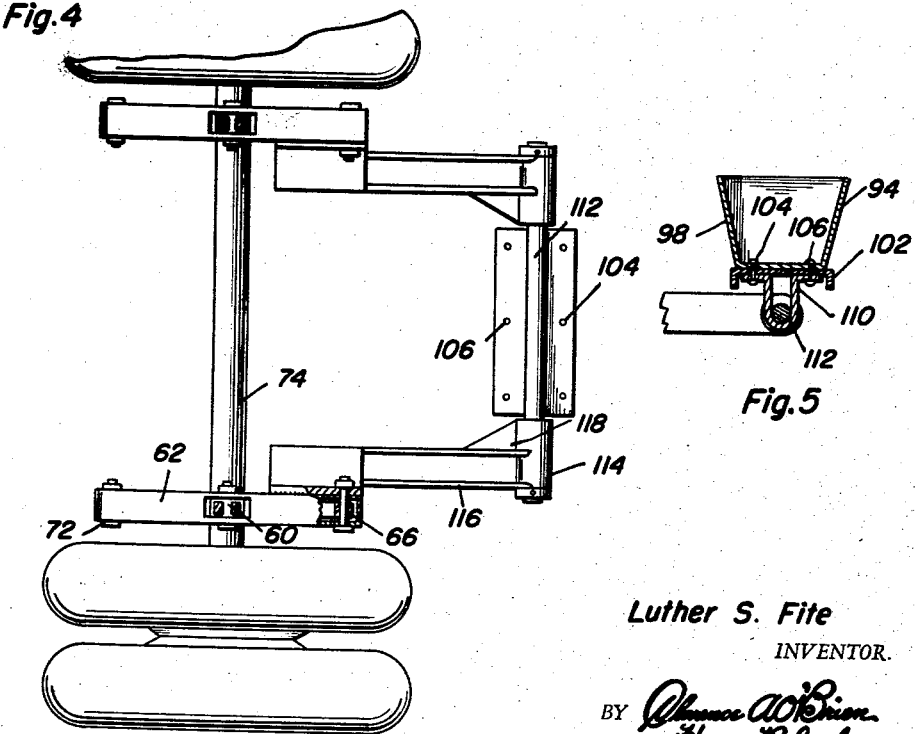
Fig.4
Fig.5
Luther S. Fite
    INVENTOR.
BY July 5, 1960

L. S. FITE 2,943,865

WEIGHT DISTRIBUTING TRUCK BED ATTACHMENT

Filed March 25, 1958

Luther S. Fite
INVENTOR.

BY *Clarence A. O'Brien*
*and Harvey B. Jackson*
Attorneys

United States Patent Office 2,943,865
Patented July 5, 1960

2,943,865

WEIGHT DISTRIBUTING TRUCK BED ATTACHMENT

Luther S. Fite, 9 Fatherland Road, Natchez, Miss.

Filed Mar. 25, 1958, Ser. No. 723,920

8 Claims. (Cl. 280—104.5)

This invention relates generally to a truck bed attachment and more particularly to an attachment for truck beds utilized for distributing the weight of a loaded bed over a greater number of wheels than the distributed weight of an unloaded bed.

In the trucking industry, it is often desirable to utilize a greater number of wheels for more evenly distributing the weight load when the truck bed is loaded than when the bed is unloaded. That is, extra wheels on an unloaded truck would add to the drag and inefficiency and of course, operating costs of the truck.

This invention relates to an equalizing arrangement or device between a live or driving axle and an auxiliary or towed axle. An equalizing bar is pivotally connected to a truck bed intermediate its end portions and is pivotally and terminally retained proximate the live axle. The pivotal connection proximate the live axle is positioned so as to be lower than the pivotal connection to the truck bed when the bed is unloaded. This construction elevates one end of the equalizing bar. This elevated end carries the towed axle which in turn carries a pair of rotatably and terminally mounted wheels. The apparatus is designed and constructed so that the auxiliary or towed axle and wheels and live driving axle and wheels will both carry approximately equal weight after the weight load on the truck bed exceeds a predetermined weight load. When the load is removed from the truck bed the drive axle spring raises the truck frame which in turn raises the truck bed causing the auxiliary or towed axle to raise relative to the live or driving axle. This action allows the auxiliary or towed axle and mounted wheels to ride free of the highway on return or empty trips.

It is therefore a principal object of this invention to provide a novel and improved truck bed attachment for improving the weight distribution on loaded truck beds.

The apparatus comprising this invention is so designed and constructed to permit the wheels to walk over uneven terrain and yet still maintain the proper distributed weight differential at all times. Accordingly, it is a further object of this invention to provide truck apparatus which when installed will effect considerable savings in tires and wheels.

It is a further object of this invention to provide greater economy in operating and maintenance cost for trucks making frequent loaded and unloaded trips.

Further, the apparatus comprising this invention permits the effective use of a longer truck bed on a smaller truck allowing an increase in pay load while at the same time meeting the load requirements of state highway authorities with respect to types of trucks. Still further, it is understood that the teachings of this invention are adaptable for utilization with various type trucks designed for hauling various type loads.

In certain sections of the country, truckers, particularly pulpwood haulers, have resorted to welding a second or towed axle directly to the truck frame to the rear of the live or driving axle to increase the length of the truck bed. It will readily be understood that such rigid arrangement is very unsatisfactory on uneven terrain and therefore it is often necessary that these modified trucks be towed by means of tractors to the highway leading to the market when loaded.

The apparatus comprising this invention of course can be utilized as a truck bed attachment or may be constructed as original truck equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational plan view of a portion of a truck bed frame utilizing the teachings of this invention;

Figure 4 is a sectional view taken substantially along the plane 4—4 of Figure 2;

Figure 5 is a sectional view taken substantially along the plane 5—5 of Figure 1.

Figure 2:
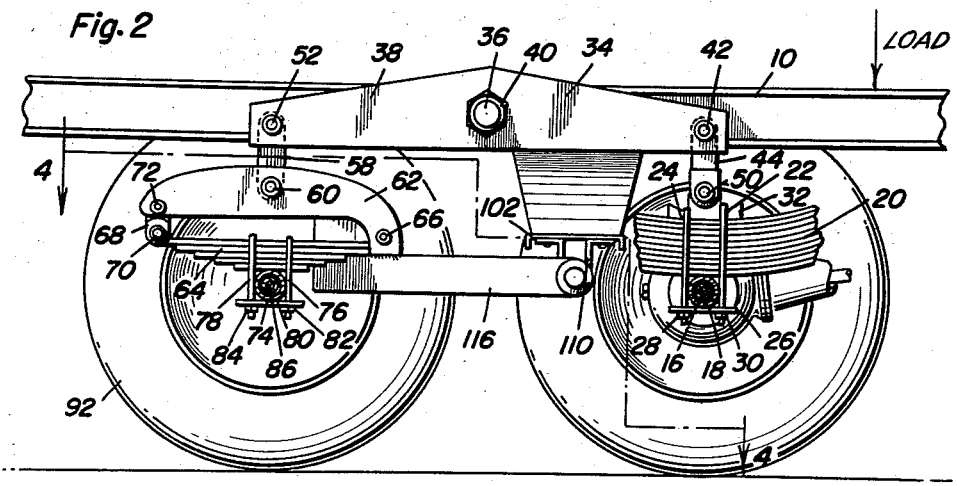
Figure 2 is a sectional view taken substantially along the plane 2—2 of Figure 1.

With continuing reference to the drawings, numeral 10 generally represents the truck bed frame (that is, the sill or frame rack) which is removably bolted to the truck frame (not shown) of a conventional truck. The truck of course would have a conventional differential gear system 12 actuated through driving means 14 for rotating axle 16 carried in axle housing 18. Springs 20 are supported from the truck frame and are held relative to the axle housing 18 by a pair of U-shaped clamps 22 and 24. A cross-member 26 connects the U-shaped clamps 22 and 24 below the axle housing 18. A pair of nuts 28 and 30 maintain the cross-member 26 properly positioned below the axle housing 18. A saddle 32 properly aligns the U-shaped clamps relative to the spring 20 and axle 18.

An equalizing bar 34 is pivotally connected to the truck bed frame 10 by a rotatable shaft 36 which extends transversely to the frame 10. The equalizing bar includes two portions designated as 37 and 38. Since the operation of the two portions is identical, reference will be made exclusively to the portion 38.

The equalizing bar 38 is maintained on the rotatable shaft 36 by a nut as at 40 and is pivotally connected at 42 to a link 44. The pivotal connection includes a bolt 46 and nut 48. Further, the link 44 is pivotally connected at 50 to a portion of the saddle 32.

A second end of the equalizing bar is bolted as at 52 by bolt 54 and nut 56 so as to pivot relative to link 58. The link 58 is further pivotally connected at 60 to a spring housing 62. The spring housing 62 supports a series of springs 64 between a bolted connection 66 and a bolted connection to link 68 at 70. The link 68 is further fixed to the spring housing 62 at 72.

The springs 64 are maintained adjacent a towed axle housing 74 by means of U-shaped clamps 76 and 78. A cross-member 80 is held by nuts 82 and 84, properly positioning the towed axle housing 74 and clamps and spring together. The towed axle 86 passes through the towed axle housing 74 and rotatably connects a pair of wheels 90 and 92.

Figure 6:
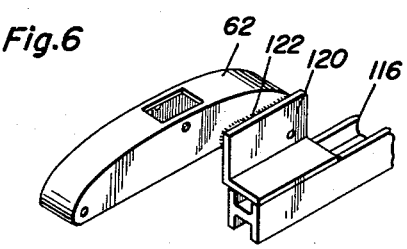
Figure 6 is a perspective view of the related spring housing and tow bar.

A towing frame in the form of a trough including a plurality of sides as at 94, 96, 98 and 100 and a bottom 101 is welded to the truck bed frame 10 and is of course rigidly fixed thereto. The sides 94, 96, 98 and 100 and the bottom 101 support a flanged plate 102 which is bolted to the bottom 101. The plate 102 is bolted, as by bolts 104 and 106 to a U-shaped frame member 110 which carries a shaft 112. The shaft 112 rotatably supports therearound a collar 114 which is welded to a towing bar 116. An angle portion 118 is provided for additional rigid support between the collar 114 and the towing bar 116. Particularly referring to Figure 6, the towing bar 116 which may be I-shaped is welded to an angle bracket 120 which is in turn welded to the spring housing 62 as at 122.

Figure 3:
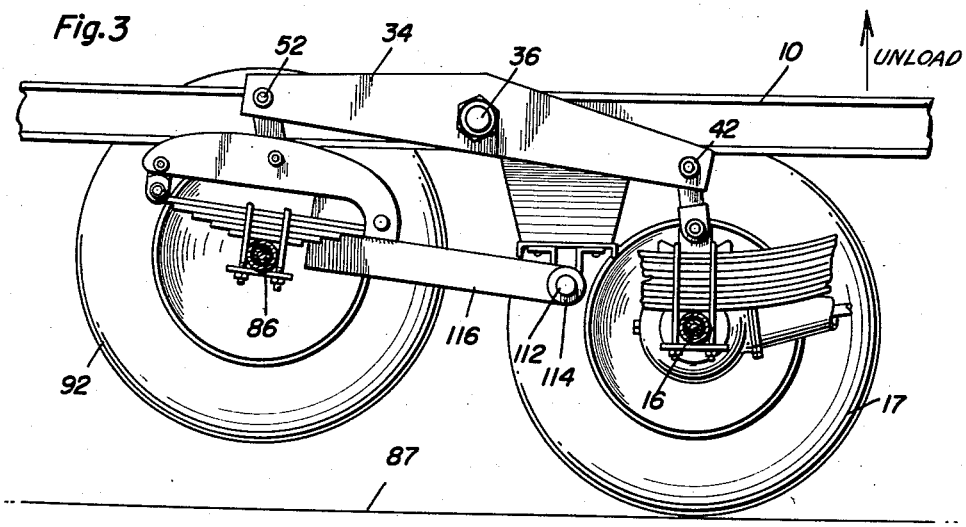
Figure 3 is a sectional view similar to the view of Figure 2 showing the truck bed frame in the unloaded position.

The operation and utilization of this device should now be apparent. Initially referring to Figure 3, the truck bed frame 10 is shown in an unloaded position with the equalizing bar 34 maintaining the towed axle 86 a particular distance off the ground 87. As is apparent from the drawings, the particular construction and relative positioning of the pivotal points 42 and 36 prescribe the unloaded inclined position of the equalizing bar 34. In the unloaded position of Figure 3, the driving axle 16 may drive the wheel as 17 to drive the truck bed frame 10 without any drag being provided by the towed axle 86. It will further be apparent that the towed axle 86 is sufficiently raised off the ground so that unlevel terrain will not hinder the movement of the truck. Upon loading the truck bed frame 10, the shaft 36 will be carried substantially vertically downwardly as the truck frame is depressed on springs 20. The downward force on the shaft 36 pivots the equalizing bar about the pivot point 42. The pivot point 52 and the towed axle 86 will pass through an approximately arcuate path about pivot point 42. Since the pivot point 52 is approximately twice as far from pivot point 42 as pivot point 36, if a particular load depresses the truck bed frame 10 four inches, the pivot point 52 must necessarily be depressed approximately eight inches. As pivot point 52 is depressed eight inches, the towed axle 86 is likewise depressed approximately this distance, so that the wheel comes in contact with the ground 87 distributing the load on the wheels. The loaded frame is shown in Figure 2. As the loaded truck is driven, the driving force provided to the live axle 16 is conveyed to the frame. Further, the driving force is conveyed through the bolted members 94, 96, 98 and 100 to the towing bar 116 which tows the spring housing 62 through the welded joints as 122. Of course, the towed axle 86 is correspondingly towed as the axle housing 74 is pulled through the clamps 76 and 78 and cross-member 80. As is apparent from Figure 3, the tow bar 116 is pivotally related to the shaft 112 by collars 114 so the tow bar 116 may assume the inclined position of Figure 3 when the equalizing bar assumes its normally inclined position when the truck frame is unloaded.

It is to be noted that the truck bed with the apparatus attached is easily adaptable to various forms of truck frames and may be easily and inexpensively installed by bolting the truck bed frame 10 to the truck frame, pivoting link 44 to the saddle and pivotal connection 50, and bolting the plate 102 and frame 110 to the supporting sides 94, 96, 98, and 100 to establish the towing relationship of towing bar 116.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed, means terminally and pivotally connecting said bar to said live truck axle, said pivotal connection in alignment with said live axle, said bar terminally and pivotally carrying a towed axle remote from said live axle, said resilient suspension associated with said live axle being of sufficient strength to raise said bed when in an unloaded condition relative to said live axle whereby said pivot point between said bar and live axle will be raised to elevate said towed axle relative to said live axle.

2. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, means terminally and pivotally connecting a first end of said equalizing bar to said live axle, said pivotal connection in alignment with said live axle, a second end of said equalizing bar terminally and pivotally carrying a towed axle remote from said live axle, said resilient suspension associated with said live axle being of sufficient strength to raise said bed when in an unloaded condition relative to said live axle whereby said pivot point between said bar and bed will be raised to elevate said towed axle relative to said live axle.

3. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, means terminally and pivotally connecting a first end of said equalizing bar to said live axle, said pivotal connection in alignment with said live axle, a second end of said equalizing bar terminally and pivotally carrying a towed axle remote from said live axle, a tow bar supported from said bed, said tow bar communicating with a housing for said towed axle, said resilient suspension associated with said live axle being of sufficient strength to raise said bed when in an unloaded condition relative to said live axle whereby said pivot point between said bar and bed will be raised to elevate said towed axle relative to said live axle.

4. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, a pair of links terminally and pivotally carried by said equalizing bar, a first of said links pivotally connected to said live axle, said pivotal connection in alignment with said live axle, a second of said links pivotally carrying a towed axle, said resilient suspension associated with said live axle being of sufficient strength to raise said bed when in an unloaded condition relative to said live axle whereby said pivot point between said bar and bed will be raised to elevate said towed axle relative to said live axle.

5. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, a pair of links terminally and pivotally carried by said equalizing bar, a first of said links pivotally connected to said live axle, said pivotal connection in alignment with said live axle, a second of said links pivotally carrying a towed axle, a tow bar supported from said bed, said tow bar rigidly communicating with a housing for said towed axle, said resilient suspension associated with said live axle being of sufficient strength to raise said bed when in an unloaded condition relative to said live axle whereby said pivot point between said bar and bed will be raised to elevate said towed axle relative to said live axle.

6. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, means terminally and pivotally connecting a first end of said equalizing bar to said live axle so that said first end is lower than the pivotal support point between the bar and the bed thereby normally biasing said bar in an inclined direction, said pivotal connection in alignment with said live axle, a second end of said equalizing bar pivotally carrying a towed axle, said resilient suspension associated with said live axle being of sufficient strength to raise said bed when in an unloaded condition relative to said live axle whereby said pivot point between said bar and bed will be raised to elevate said towed axle relative to said live axle.

7. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, means terminally and pivotally connecting a first end of said equalizing bar to said live axle so that said first end is lower than the pivotal support point between the bar and the bed thereby normally biasing said bar in an inclined direction, said pivotal connection in alignment with said live axle, a second end of said equalizing bar pivotally carrying a towed axle, a tow bar supported from said bed, said tow bar rigidly communicating with a housing for said towed axle, said resilient suspension associated with said live axle being of sufficient strength to raise said bed when in an unloaded condition relative to said live axle whereby said pivot point between said bar and bed will be raised to elevate said towed axle relative to said live axle.

8. A truck bed attachment for distributing the weight of a loaded bed over a greater number of wheels than the distributed weight of an unloaded bed comprising in combination with a truck frame having a resiliently suspended live axle, a rigid elongated equalizing bar pivotally supported by said truck bed intermediate the ends thereof, means terminally and pivotally connecting a first end of said equalizing bar to said live axle so that said first end is lower than the pivotal support point between the bar and the bed thereby normally biasing said bar in an inclined direction, said pivotal connection in alignment with said live axle, a second end of said equalizing bar pivotally carrying a towed axle, a shaft dependingly supported from said bed rigid with said bed, a tow bar pivotally carried on said shaft and rigidly communicating with a housing for said towed axle, said resilient suspension associated with said live axle being of sufficient strength to raise said bed when in an unloaded condition relative to said live axle whereby said pivot point between said bar and bed will be raised to elevate said towed axle relative to said live axle.

References Cited in the file of this patent

UNITED STATES PATENTS

| | | |
|---|---|---|
| 810,722 | Cook | Jan. 23, 1906 |
| 1,404,631 | Molesworth | Jan. 24, 1922 |
| 1,857,249 | Marcum | May 10, 1932 |
| 1,926,273 | Fageol | Sept. 12, 1933 |

FOREIGN PATENTS

| | | |
|---|---|---|
| 129,795 | Australia | Nov. 3, 1948 |